United States Patent [19]

Dupre

[11] 4,432,121
[45] Feb. 21, 1984

[54] SAFETY HOOK OR ELASTIC FASTENING AND SECURING CABLES OF THE SANDOW TYPE

[75] Inventor: Armand Dupre, Saint.Etienne, France

[73] Assignee: Societe Dupre, France

[21] Appl. No.: 275,112

[22] Filed: Jun. 18, 1981

[30] Foreign Application Priority Data

Jun. 18, 1980 [DE] Fed. Rep. of Germany ....... 8014580

[51] Int. Cl.³ ...................... A44B 13/00; F16G 11/04
[52] U.S. Cl. .................................. 24/343; 24/115 H; 24/130; 24/230.5 R
[58] Field of Search ............ 24/115 R, 130, 343–345, 24/300, 301, 115 H, 115 K, 230.5, 230.5 AD, 230.5 TP, 370; 294/82 R; D8/367; 292/95, 114, 101, 136

[56] References Cited

U.S. PATENT DOCUMENTS

| | | | |
|---|---|---|---|
| 1,361,249 | 12/1920 | Giffen | 24/115 R |
| 1,459,329 | 6/1923 | Girot | 24/115 R |
| 1,685,145 | 9/1928 | Bartenbach et al. | 24/230.5 R |

FOREIGN PATENT DOCUMENTS

| | | | |
|---|---|---|---|
| 633102 | 7/1936 | Fed. Rep. of Germany | 24/130 |
| 515102 | 12/1917 | France . | |
| 2401353 | 10/1977 | France . | |
| 2427508 | 6/1978 | France . | |
| 2455693 | 6/1978 | France | 24/130 |

Primary Examiner—Gene Mancene
Assistant Examiner—John G. Weiss
Attorney, Agent, or Firm—Eric P. Schellin

[57] ABSTRACT

A safety hook for elastic fastening and securing cables, comprising a head portion forming a hook, a guiding tunnel through which the elastic cable is passed, and an anchoring beak through which a loop of the elastic cable is secured. The anchoring beak forms an offset cavity with a facing wall of the base portion of the hook which is used to grip the cable. Elastic cable is looped through the guiding tunnel and is crimped and held within the offset cavity.

3 Claims, 13 Drawing Figures

SAFETY HOOK OR ELASTIC FASTENING AND SECURING CABLES OF THE SANDOW TYPE

BACKGROUND OF THE INVENTION

This invention has for its object a safety hook for elastic fastening and securing cables of the sandow type.

Elastic cables or cords, which are so-called sandows, are currently used for many purposes, for securing packages or luggage on the luggage top railings of motor cars or the like.

The well-known type of hook used heretofore has been illustrated FIG. 1. The incorrect use of the sandows has always been the cause of many serious casulaties (more particularly injuries to the face). The reasons for these accidents, have been classified into the following types when securing parcels on the luggage top railings of motor cars, by throwing out the metal hook the loop which was opened unexpectedly, and by whipping of the elastic cable provided with the set wherein the cable with the ring is passed through the shank of the hook. These distortions and breakages are originated by overstretchings or overloadings, on account of the remoteness of the anchoring points as compared with the rated length of the elastic cables or sandows. As the sandows have a steady working length between their two ends, it will be obvious that the user would have to select sandow lengths which are different in accordance with the use contemplated. In practice, it is found that the user has a single and same sandow of determined length for loads and tensions which may vary within considerable limits, whence the above named casulaties; a distortion or a breaking of the hook happens, throwing up the cable-hook unit against the user.

Two facts connected with the social evolution tend to increase the number of casualties and the resulting consequences for the manufacturer:

the evolution in the holidays resulting in the enlarging of the number of the customers and in a larger need to transport, and therefore to secure, luggage and materials which are more and more bulky and heavy, as they are more and more technical (sail boards for instance);

the new trend inciting the buyer to consider that the fact of buying is accompanied by an "all-in insurance policy", as far as the use of this product is concerned; more and more safety is required for a product by the buyers, regardless of the correct or incorrect use which is made of the product.

Taking into account these requirements and trends, the object of the invention has been the provision of an item suppressing or reducing to a minimum the operational risks resulting from the throwing out of the cable-hook unit, in the event of breaking or distortion.

Another object of the invention is to provide possibilities of varying length adjustment of the sandows, in order to adapt this length to the distance between the anchoring points and to the optimum loading of the cable, while preventing the throwing out of the cable-hook unit in the event of breaking or distortion.

Another object is the provision of a simple hook for an easy handling of the elastic cables, making it possible to adjust them in all safety.

Hooks which permit the adjustment of the tension of the elastic strand have already been developed by the Applicant for the present Application. This is more particularly the case with the French Patent application No. 2.427.508 and the co-pending Certificates of Addition No. 78.22059 and 78.37070, filed to the name of the Inventor for the present Application.

In accordance with the invention, it has been desired to improve still further the hooks disclosed in the above references, by distributing in a novel and more rational manner the stress resulting from the pull of the elastic cables on the hook assembly. Finally, the adjustment of the stretching of the elastic strands has been made simpler and easier. Moreover, it is possible, according to the present invention, to fit the elastic cables without special tools or procedures.

The FR Pat. Nos. 515.102 and 2.401.353, as well as the U.S. Pat. Nos. 1.361,249 and 1.459.329, are known to the Applicant. These references do not concern the use of elastic cables known under the name of sandows, the constitution and the resulting stresses of which are specific and without any relation to other types of cables such as wires or ropings. Moreover, the objects claimed by and the purpose of the above Patents are quite different from the objects and purpose of this Application, and therefore the characteristics of the invention can not be traversed by the embodiments of said Patents.

SUMMARY OF THE INVENTION

In accordance with a first characteristic of the invention, the safety hook is noteworthy in that it includes a hook-shaped head having a lower portion thereof normal to the longitudinal plane thereof, and on either side of the jointing lower outmost portion of said hook, in the form of a transversal guide tunnel for the passage of the two strands of an elastic cable or sandow folded upon itself and defining a loop, with a portion in the form of a beak, defining together with the opposite wall of the hook an open constricted section, the hook in accordance with the invention being such that after overturning of the outmost strand of the cable to form a loop, the latter is engaged within the tunnel mentioned above, then is stretched to pass around the external periphery of the head of the hook to be thereafter engaged and clipsed by self-tightening within the open and contoured constricted section.

In accordance with a further characteristic, the constricted section for receiving and clamping the loop of the elastic cable is angularly offset relative to the direction of the directional tensile strength, so that the cable will be positioned along two different planes in succession, the tensile strength being established in the direction of the thickness of the lower body of the hook.

These and other characteristics will be apparent from the following description.

BRIEF DESCRIPTION OF THE DRAWINGS

The object of the invention will be understood more fully with reference to the attached drawings, without however being restricted thereby. In the drawings.

DETAILED DESCRIPTION OF THE PREFERRED EMBODIMENTS

Figure 2:
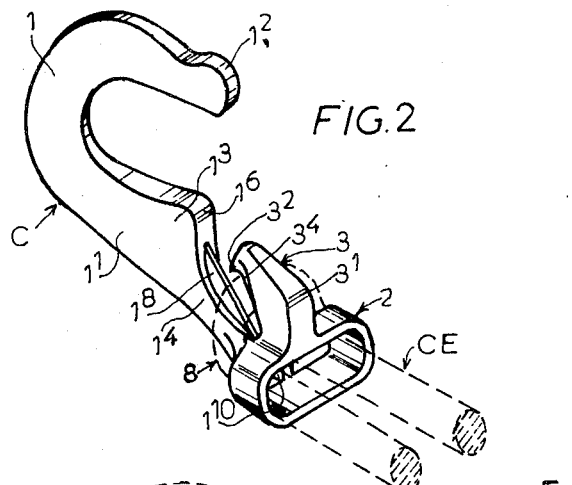
FIG. 2 is a perspective view of a hook in accordance with a first form of embodiment of the invention, after final engagement and positioning of the elastic cable.
Figure 3:
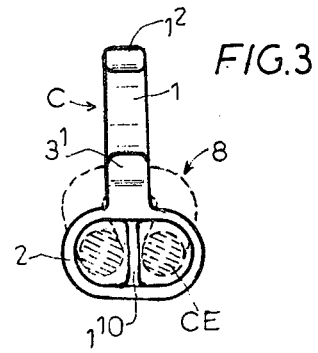
FIG. 3 is a front view, in the direction of arrow F in FIG. 2, of the hook in accordance with the invention.

The hook illustrated FIG. 2 is denoted generally by (C), and is made one piece of any plastic material or other material.

In accordance with the invention, the hook is comprised of three characteristic areas, respectively the head (1) of the hook, the guiding tunnel (2) of the elastic cable with a smooth strand (CE) and a stretched strand (CE1), and the anchoring means (3) of the latter.

The curved head (1) forming the curved portion of the hook is extended at the lower portion ($1^1$) thereof opposite to the curved-hook end ($1^2$) of the hook by a protruding enlargement ($1^3$) projecting toward the opening of the hook and situated in the middle part of the hook; this enlargement ($1^3$) extends then along a narrowing of the section thereof up to the lower base portion ($1^4$) of the hook. In accordance with an important feature of the invention, an inlet and guiding tunnel (2) for the elastic cable and the anchoring means (3) of the latter are provided on either side of the foot ($1^4$) and normal to the longitudinal axis (XX) of the hook.

Figure 4:
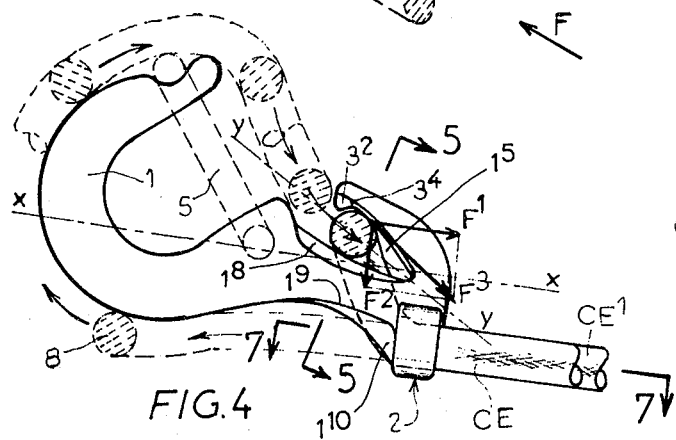
FIG. 4 is a side view illustrating more particularly the various positions of the elastic cable, from the inssertion thereof within the guiding tunnel of said hook, up to the final anchoring position of the cable.

In accordance with a first alternative form of embodiment, such as the form of embodiment illustrated in FIGS. 2 and 4, the anchoring means (3) is offset toward the outmost portion of the hook, while the inlet and guiding tunnel (2) is provided on the other side, on the rear portion of the hook. A second alternative form of embodiment has been illustrated in FIG. 6, wherein the positions of the anchoring means and of the tunnel are reversed.

In accordance with a further characteristic of the invention, the anchoring means and the tunnel (2) are disposed so that they will not be in the same plane; as a result, after engagement and final positioning of the cable within the housing thereof, the cable will be caused to break, as this is shown in FIG. 4, whereby it will be possible to establish a new distribution of the tensile forces of the cable by splitting up into partial fractions, as indicated by the arrows (F1–F2).

The anchoring means (3) includes a nose-forming portion or beak ($3^1$) beginning at the lower base portion ($1^4$) of the hook to extend in accordance with a pre-established shape toward the enlargement ($1^3$) of the head of the hook. This beak ($3^1$) is thus defining together with the gradual widening ($1^3$) disposed in the medial portion of the hook a narrowing or cavity ($1^5$) within which the elastic cable is engaged and retained. This oblong-shaped cavity ($1^5$) is established along a longitudinal axis (Y—Y) extending approximately within the area of the foot or base of the hook which is solid, ensuring thereby a substantial stiffness of the latter in case of high stress on the cable, the resulting force (F3) being directed in the thickness of the foot of the hook.

The cavity ($1^5$) mentioned above has a section which is smaller than the diameter of the inserted elastic cable, so that the latter will be retained thereby. Besides, it is possible to provide projections ($1^6$) and ($3^2$) oriented opposite to one another and established at the inlet of the cavity for positioning the elastic cable or sandow by clipsing. Areas of reduced section may also be provided within the cavity for holding and gripping any sections of sandows.

The guiding tunnel (2) is disposed within the prolongation of the base of the hook, normal or approximately normal to the latter, and is established so that the engagement of the elastic cable after overturning of the free strand will be permitted in order to define a loop (8). As illustrated in FIG. 4, this loop is then engaged within the guiding tunnel (2), and is afterwards pulled along the longitudinal plane of the hook so as to pass round the external periphery of the head (1) of the hook; thereafter, said loop is engaged within the above mentioned cavity ($1^5$) wherein the loop is retained by clamping and crimping. There has been clearly illustrated in FIG. 4 the position of the cable on the hook with the broken portion obtained of the cable along the outmost loop thereof and along strands (CE–CE1). It will be clearly understood that there is a better distribution of the efforts resulting from the tension applied on the cable, and that the mounting is easier. The adjustment of the tension and of the length of the strand remaining free is obtained quite readily by the disengagement of the loop from the cavity ($1^5$), while remaining inside the head of the hook.

Figure 7:
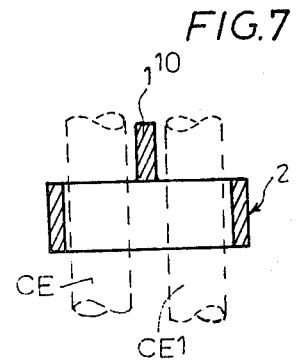
FIG. 7 is a sectional view along the line 7—7 of FIG. 4.
Figure 5:
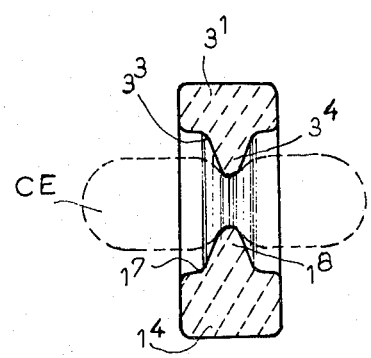
FIG. 5 is a sectional view along the line 7—7 of FIG. 4.

As illustrated in FIG. 5 of the drawings, the inside wall ($3^3$) of the anchoring beak is provided with first central rib ($3^4$) and the opposite wall ($1^7$) disposed on the base of the hook is provided with a second central rib ($1^8$); defining thereby a narrowing of the section of the cavity and ensuring the gripping of the loop of the elastic cable. It is also possible to provide on the outside wall ($1^9$) of the lower base portion of the hook a rib ($1^{10}$) running into the anchoring tunnel (2) for the independent guiding of the strands of the cable, as this is shown in FIG. 7.

Figure 6:
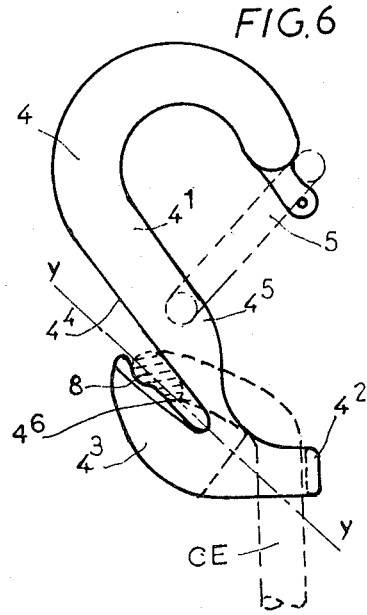
FIG. 6 illustrates a second form of embodiment of the hook in accordance with the invention.

An alternative form of embodiment has been illustrated in FIG. 6 for a hook in accordance with the invention, denoted by (4), with a head ($4^1$), a tunnel ($4^2$) for the engagement of the loop of the elastic cable and an anchoring beak ($4^3$) defining with the rear wall ($4^4$) of the lower base portion ($4^5$) of the hook a contoured cavity ($4^6$) for engaging and clamping by gripping of the loop of said cable. This hook includes all or a part of the characteristics mentioned above and described with the first form of embodiment. A detent for the closing and interlocking of the hook on the anchoring point thereof has been denoted schematically at (5).

Figure 1:
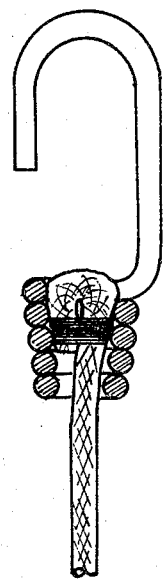
FIG. 1 illustrates the hook which was used in accordance with the prior art.
Figure 8:
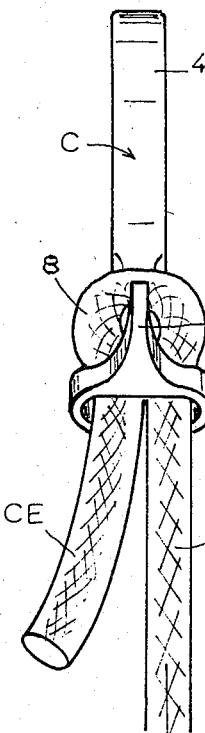
FIG. 8 is a view on a larger scale according to FIG. 6, illustrating the various tensions of the free strand and of the stretched strand.
Figure 9:
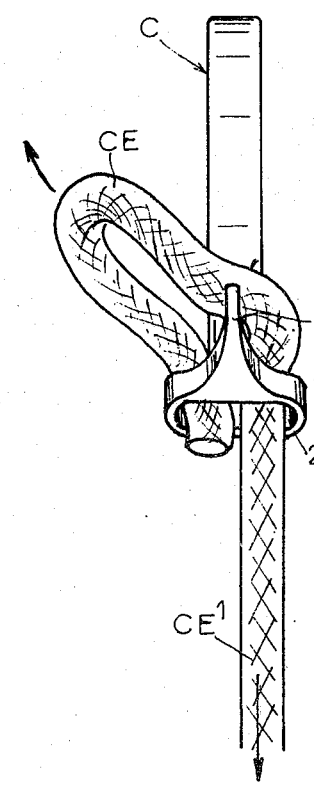
FIG. 9 is a view on a larger scale illustrating the partial engagement of the free strand, the stretched strand being inserted within the anchoring cavity.
Figure 10:
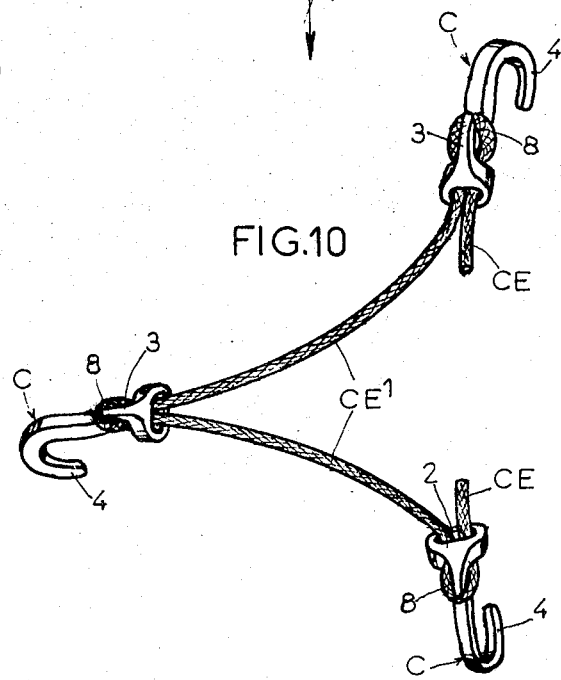
FIG. 10 is a view of a schematic character, illustrating the insertion of an intermediate hook on the stretched strand.

The advantages are clearly apparent from the description and the following features are more particularly pointed out:

the novel construction of the anchoring hook, designed for its use with elastic cables or sandows the specificities of which are particular;

the better distribution of the stress with regard to the more resisting portions of the hook;

the increased safety for the user, who has the possibility of a variable adjustment of the tension of the sandow strands in conditions of complete safety. There has been more particularly illustrated in FIG. 8 the difference of the tension of the free strand relative to the stretched strand, thanks to the differences of section. There is therefore an increased safety capacity. For adjusting the tension of the sandow, the hook in accordance with the invention gives the user the possibility to make free from the anchoring cavity, firstly one of the strands independently of the other one, then to make free the strand which is still anchored. For this purpose, the partial clearance of the free strand has been illustrated in FIG. 9, the stretched strand being still inserted fixedly within the anchoring cavity. Disengagement and clearance are perfectly safe;

the increased safety for the user, who is enabled to perform a variable adjustment of the tension of the sandows, with the possibility for the useful length (stretched strand) of the sandow to be varied to a considerable extent;

an additional use of the hook has been illustrated in FIG. 10, on a stretched strand, defining thereby an intermediate anchoring point between the ends of said stretched strand;

it will be also pointed out that the hook is subjected to pluridirectional efforts when it is mounted on the top railing of a motor car, and that substantial guarantees are offered by this hook thanks to the inventive design of same;

the ends of the sandow are neatly cut thanks to an ultrasonic hot cutting;

finally, the manufacture of the hook is easy and inexpensive

The invention is not limited in any way to the details of use and of construction or design of its various parts which have been more particularly shown herein; on the contrary, all the alternative forms of embodiment are included within the scope of the invention.

I claim:

1. A safety hook which is attached to elastic cables, said hook comprising:

a head forming a hook having a curved portion with an open end, and a lower base portion;

a transverse guide tunnel is located on both sides of said lower base portion and permits the passage of two strands of elastic cable forming a loop; and anchoring means for holding an elastic cable having a projection part forming a beak having a first central rib which is disposed adjacent to said lower base portion of said head, said beak starts at said lower base portion of said head and extends towards said curved portion of said head whereby said beak defines together with said lower base portion an offset cavity having a progressively widening profile from said lower base portion of said head towards said curved portion of said head, said cavity has successive contiguous zones with a more reduced section to assure proper positioning and pinching by crimping of an elastic cable held thereon, the lower base portion of said head is provided with a second central rib which together with said first central rib of said beak assures pinching of elastic cable held in the offset cavity.

2. A hook according to claim 1 wherein said beak is located on the same side of said lower base portion as the open end of said curved portion of said head, and said transverse guide tunnel is located on the other side of said lower base portion of said head.

3. A hook according to claim 1 wherein said transverse guide tunnel is located on the same side of said lower base portion as the open end of said curved portion of said head and said beak is located on the other side of said lower base portion of said head.

* * * * *

UNITED STATES PATENT AND TRADEMARK OFFICE
CERTIFICATE OF CORRECTION

PATENT NO. : 4,432,121
DATED : February 21, 1984
INVENTOR(S) : Armand Dupre

It is certified that error appears in the above-identified patent and that said Letters Patent is hereby corrected as shown below:

On the title page foreign application priority data should read

--June 18, 1980   France         8014580 --.

Signed and Sealed this

First Day of September, 1987

Attest:

DONALD J. QUIGG

Attesting Officer

Commissioner of Patents and Trademarks